(12) United States Patent
Schwartz et al.

(10) Patent No.: US 10,371,524 B2
(45) Date of Patent: Aug. 6, 2019

(54) COMPACT THREE-FREQUENCY RESONANT OPTICAL GYROSCOPE

(71) Applicants: THALES, Courbevoie (FR); CENTRE NATIONAL DE LA RECHERCHE SCIENTIFIQUE, Paris (FR); ECOLE NORMALE SUPERIEURE DE CACHAN, Cachan (FR)

(72) Inventors: Sylvain Schwartz, Saint Remy les Chevreuse (FR); Gilles Feugnet, Palaiseau (FR); Arnaud Brignon, Bourg la Reine (FR); Fabien Bretenaker, Velizy Villacoublay (FR)

(73) Assignees: THALES, Courbevoie (FR); CENTRE NATIONAL DE LA RECHERCHE SCIENTIFIQUE, Paris (FR); ECOLE NORMALE SUPERIEURE DE CACHAN, Cachan (FR)

( * ) Notice: Subject to any disclaimer, the term of this patent is extended or adjusted under 35 U.S.C. 154(b) by 119 days.

(21) Appl. No.: 15/480,129

(22) Filed: Apr. 5, 2017

(65) Prior Publication Data

US 2017/0299390 A1   Oct. 19, 2017

(30) Foreign Application Priority Data

Apr. 6, 2016 (FR) ..................................... 16 00581

(51) Int. Cl.
*G01C 19/72* (2006.01)
(52) U.S. Cl.
CPC .................. *G01C 19/727* (2013.01)
(58) Field of Classification Search
CPC ............................ G01C 19/723; G01C 19/727
See application file for complete search history.

(56) References Cited

U.S. PATENT DOCUMENTS

| 7,106,448 B1* | 9/2006 | Vawter | G01C 19/72 |
| | | | 356/461 |
| 2014/0044142 A1* | 2/2014 | Strandjord | G01C 19/727 |
| | | | 372/32 |

(Continued)

FOREIGN PATENT DOCUMENTS

| EP | 2 813 815 A2 | 12/2014 |
| EP | 2 960 626 A1 | 12/2015 |
| FR | 3 011 632 A1 | 4/2015 |

OTHER PUBLICATIONS

Black, Eric. "An introduction to Pound-Drever-Hall laser frequency stabilization". Am. J. Phys., vol. 69, No. 1, Jan. 2001, pp. 79-87. (Year: 2001).*

*Primary Examiner* — Michael A Lyons
(74) *Attorney, Agent, or Firm* — Baker & Hostetler LLP

(57) ABSTRACT

A passive resonant optical gyroscope comprising a cavity and operating with three frequencies comprises: a first injecting laser to inject a first optical beam into the cavity in a first direction; a second injecting laser to inject a second optical beam into the cavity in an opposite direction; a third injecting laser to inject a third optical beam into the cavity in one of the aforementioned directions, one laser amongst the injecting lasers having a master frequency, the two other injecting lasers, called the first and second slave lasers, respectively having a first slave frequency and a second slave frequency; a master servocontrol device; a first servocontrol stage comprising first and second slave devices; and a second servocontrol stage comprising first and second optical phase-locking devices respectively comprising a first and second slave oscillator to generate a first radiofrequency offset signal and a second radiofrequency offset signal.

12 Claims, 10 Drawing Sheets

(56) References Cited

U.S. PATENT DOCUMENTS

2014/0369699 A1* 12/2014 Strandjord ........... G01C 19/721
398/187
2015/0098089 A1 4/2015 Schwartz et al.
2015/0369605 A1* 12/2015 Strandjord ........... G01C 19/721
356/461

* cited by examiner

COMPACT THREE-FREQUENCY RESONANT OPTICAL GYROSCOPE

CROSS-REFERENCE TO RELATED APPLICATIONS

This application claims priority to foreign French patent application No. FR 1600581, filed on Apr. 6, 2016, the disclosure of which is incorporated by reference in its entirety.

FIELD OF THE INVENTION

The field of the invention is that of optical gyroscopes, in particular used in the field of inertial navigation. More precisely, the field of the invention is that of passive resonant optical gyroscopes.

BACKGROUND

Optical gyroscopes are based on the underlying principle of measurement of the Sagnac effect. The latter induces, under the effect of a rotation, a path-delay difference between two electromagnetic signals propagating in opposite directions along a ring-shaped path. This path-delay difference, which is proportional to the angular velocity of the device, may be measured either as a phase difference in the case of an interferometer set-up, or as an eigenfrequency difference between two contra-rotating modes of a ring cavity.

In the first case, it is necessary to use an optical fibre to maximise the length of the interferometer and therefore the sensitivity of the device. An interferometric fibre optic gyroscope (I-FOG) is then spoken of.

In the second case, the difference between the eigenfrequencies of the modes of the cavity may be measured in two ways. The first consists in using an active cavity, i.e. one containing a gain medium, and in measuring the frequency difference between the contra-rotating modes emitted by the cavity. Ring laser gyroscopes or RLGs are then spoken of. The second way consists in using a passive resonant cavity and in probing the eigenfrequencies of the contra-rotating modes using a laser. A passive resonant gyroscope is then spoken of.

The passive resonant gyroscope configuration possesses a certain number of advantages with respect to the other configurations. With respect to the RLG configuration, it in particular avoids the need to use a gaseous gain medium and the high-voltage system of electrodes that is conventionally associated therewith. With respect to the I-FOG configuration, it has the advantage of a much shorter optical path, this decreasing sensitivity to the environment and increasing compactness. Lastly, it employs only standard components. Thus, in particular, there is no need to use a superluminescent source.

However, although these three types of gyroscopes i.e. the I-FOG, RLG and passive resonant gyroscope, have all been demonstrated experimentally, currently, only the first two have found use in industrial applications. One of the things holding back the development of passive resonant gyrometers is the problem of backscattering of the light, which creates coupling between the contra-rotating modes, this creating a nonlinearity in the frequency response and a "blind spot" just as in conventional laser gyros, and degrading the performance of the system.

One solution to the problem of coupling between contra-propagating modes is described in document FR 1302311. This system probes the eigenfrequencies of the contra-rotating modes of a ring cavity while avoiding the problems conventionally created by backscatter, and while simultaneously providing a measurement of cavity length intended to be used to evaluate (and possibly to servocontrol to a constant value) the scale factor of the passive resonant gyroscope thus produced.

The underlying principle of this system is to use three beams at three different frequencies (instead of the two used in conventional gyroscopes). The system includes a ring cavity and a laser the emission of which is divided into three beams of different optical frequencies. By way of example, the cavity may consist of a hollow fibre to limit the Kerr effect. Each frequency is separated from the two other frequencies by a value corresponding to an integer multiple of the free spectral range of the cavity. The free spectral range (FSR) of the cavity is conventionally:

FSR=c/L c being the speed of light and L the optical length of the ring cavity.

The first beam is servocontrolled to one mode of the cavity in one propagation direction and the two others are servocontrolled to two other modes of the cavity corresponding to the opposite propagation direction. It will be noted that it is also possible to invert the servocontrol, i.e. to servocontrol a first eigenfrequency corresponding to a first resonant mode of the cavity to the first frequency of the first optical beam, for example by servocontrolling the length of the cavity.

The frequencies of the three beams are at any given time sufficiently far apart for the effect of coupling between the beams to be negligible.

In the absence of rotation, each beam is servocontrolled to one different eigenfrequency of the cavity, denoted:

$f_1 = N_1 \cdot c/L$ for the first beam;
$f_2 = N_2 \cdot c/L$ for the second beam; and
$f_3 = N_3 \cdot c/L$ for the third beam;

where $N_1$, $N_2$ and $N_3$ are known integer numbers that are all different.

The frequencies must be sufficiently close for the difference between the frequencies of each pair of beams to be compatible with the passband of a photodiode.

In the presence of a rotation, the frequency difference of the two beams propagating in the same direction allows the length of the cavity to be determined, whereas the frequency difference between two contra-rotating beams combined with the information on the length of the cavity allows the angular velocity of the assembly to be determined.

Thus, a gyroscope operating with 3 frequencies comprises means for measuring the frequency difference of the two beams propagating in the same direction, and for measuring the frequency difference between two contra-rotating beams, these two frequency differences combined together allowing the length of the cavity and the angular velocity of the cavity about an axis perpendicular to the cavity to be determined. To simplify the description, these conventional measuring means are not shown in the figures.

Specifically, in the presence of a rotation, the eigenfrequencies are shifted by an amount $\Omega$ proportional to the angular velocity, thereby giving:

$$f_1 = N_1 \cdot c/L + \Omega/2;$$

$$f_2 = N_2 \cdot c/L - \Omega/2; \text{ and}$$

$$f_3 = N_3 \cdot c/L - \Omega/2.$$

At any given time, the length of the cavity may be determined by measuring the frequency difference Δfp between the beams propagating in the same direction, i.e. in the above example $\Delta f_{2-3}$:

$$L = \frac{(N_2 - N_3)}{\Delta f_{2-3}} \cdot C$$

The speed of rotation is deduced therefrom by measuring the frequency difference Δfp between two beams propagating in opposite directions, in the above example $\Delta f_{1-2}$:

$$\Omega = \Delta f_{1-2} - \Delta f_{2-3} \cdot \frac{(N_1 - N_2)}{(N_2 - N_3)}$$

The architecture proposed in document FR 1302311 is shown in FIG. 1 with mirrors. The solid lines correspond to optical paths and the dashed lines to electrical connections. The laser L emits a beam that is divided into three beams F'1, F'2 and F'3. To simplify the description, the means for measuring Δfp and $\Delta f_{1-2}$ have not been shown.

F'1 is for example injected into the ring optical cavity C of length L in the counterclockwise or CCW direction, whereas the two beams F'2 and F'3 are injected into the cavity in the clockwise or CW direction. The portion of the beams F'2 and F'3 transmitted through the coupler 10 (semi-silvered mirror) passes through the optical fibre and is reflected by the optical coupler 11, then the coupler 10, so as to form the cavity. The portion of the beam F'1 transmitted through the coupler 11 passes through the optical fibre and the coupler 11, and is reflected by the coupler 10 so as to form the cavity.

At resonance, the back-reflected intensity output from the cavity is minimal, and this property is used to servocontrol the frequencies of the three beams to the eigenmodes of the cavity. For example, the beam 101 reflected by the coupler 11 downwards in FIG. 1 is used to servocontrol the frequency of F'1. Said beam corresponds to the coherent superposition of the portion of the beam F'1 directly reflected by 11 and the portion formed by the beams propagating in the cavity in the CCW direction, which result from the superposition of beams having made one, two, three, etc. complete circuits of the cavity in the CCW direction. Likewise, the beams 102 and 103 directed upwards in FIG. 1 are respectively used to servocontrol the frequencies of F'2 and F'3. Said beams correspond to the coherent superposition of the portion of F'2 and F'3 directly reflected by the coupler 10 and the portions of F'2 and F'3 transmitted by this coupler 10, then guided through the cavity in the CW direction, then reflected by 11 and lastly transmitted by 10, corresponding to the superposition of the beams having made one, two, three, etc. complete circuits of the cavity in the CW direction.

The beam F'1 is servocontrolled to an eigenmode of the cavity by controlling the laser L directly using the photodiode PhD1 and a servocontrol device DA'1, which includes an optical portion DA'o1 and an electrical portion DA'e1.

The beams F'2 and F'3 are servocontrolled to eigenmodes of the cavity using the photodiode PhD23 and servocontrol devices DA'2, DA'3, which each include an optical portion (DA'o2, DA'o3) acting directly on the optical frequency, and an electrical portion (DA'e2, DA'e3).

More generally one of the beams has an eigenfrequency maintained at resonance—in the nonlimiting example, the beam F'1 (but it could be one of the other beams)—by direct servocontrol of the laser in the variant Opt1 illustrated in FIG. 2. According to another variant Opt2 illustrated in FIG. 3, the frequency of the beam F'1 is maintained at resonance by directly servocontrolling the length L of the cavity, for example using a piezoelectric modulator.

We will now explain the way in which the laser is directly servocontrolled, such as illustrated in FIG. 2. The beam F'1 passes through a phase modulator PM1 so as to generate sidebands required to obtain a frequency error signal ε1 allowing the frequency to be servocontrolled so as to place (absence of rotation) or keep (presence of rotation) the frequency of the beam F'1 in resonance with the cavity mode in question. This method is based on the technique called the Pound-Drever-Hall technique, named after its inventors, and which is well known to those skilled in the art.

The beam 101 is modulated by a phase modulator PM1, which is placed in the optical portion DA'o1, so as to create sidebands at frequencies separated from the initial frequency f'1 by multiples of the modulation frequency, $f_{m1}$, applied by the oscillator Os1 via PM1.

This frequency is chosen, if possible, to be higher than the width of the resonance of the cavity (and lower than the free spectral range of the cavity) so that the sidebands are not in resonance with the cavity. To simplify the explanation, only the two first sidebands, separated by $\pm f_{m1}$ from the initial frequency f'1, will be considered. The beam 101 (which therefore has three spectral components at $f'1-f_{m1}$, f'1 and $f'1+f_{m1}$) is detected by a photodiode $PhD_1$, the output signal of which is demodulated by the modulating signal applied to PM1 with an adjustment of their respective phases (phase shifter Dph1) requiring the use of an electrical mixer M1. A lowpass filter (not shown) then allows the DC component of the demodulated signal to be isolated, the amplitude ε1 of which is then proportional to the difference between the frequency f'1 of the laser and the resonant frequency of the cavity. Specifically, when the frequency f'1 of the laser and the resonant frequency of the cavity differ slightly, the two sidebands are unchanged (if they are far out of resonance) whereas the phase and amplitude of the beam at the frequency f'1 varies (since it is no longer in resonance). The coherence properties of the three spectral components of 101 then allow these fluctuations (three-beam interference) to be measured as they cause a linear variation in the demodulated signal which may thus be used as a frequency error signal, ε1 cancelling out when the beam F'1 is resonant with a mode of the cavity. Servocontrol is then achieved with this signal, via control electronics ER1, using a conventional servocontrol method, for example, non-limitingly, PI or PID control devices (PID standing for proportional integral derivative, a reference to the three modes of action on the error signal of the control electronics). This type of control, which allows the error signal to converge on a zero value, is well known in automatic control.

Regarding the choice of the modulation frequency to be applied to PM1, if the finesse of the cavity is high, the width of the cavity will be small relative to the free spectral range and it will be possible to choose a modulation frequency that is very high relative to the frequency width of the resonant peaks of the cavity. The optimal situation, corresponding to the preceding explanation, will then be achieved for this servocontrol. In contrast, if the finesse of the cavity is not very high, the modulation frequency will be close to the frequency width of the resonant peaks of the cavity. The sidebands will then be partially modified when the frequency f'1 differs from the resonance and the servocontrol will be less effective.

The servocontrol loop controls the laser for example via the current injected (FIG. 2) so as to set (absence of rotation) or keep (presence of angular rotation Ω) the frequency f'1 of the laser equal to a resonant frequency of the cavity:

$$f'1 = N_1 \cdot c/L + \Omega/2$$

In the embodiment in FIG. 3, it is the length of the cavity that is servocontrolled, the frequency of the laser remaining constant.

Thus, the optical portion DA'o1 of the servocontrol device DA'1 comprises the phase modulator PM1 and the electrical portion DA'e1 connected to the output of the photodetector $PhD_1$ comprises a demodulating portion containing the phase shifter PhD1, the mixer M1, and the oscillator Os1 of frequency $f_{m1}$, which also supplies PM1; and the control electronics ER1.

An exemplary servocontrol mechanism for controlling the frequencies f2 and f3 respectively of the beams F'2 and F'3 is schematically shown in FIG. 4. The servocontrol device is the same as for F'1. However, as there is only a single laser (or only a single cavity) it is no longer possible to act on these elements. It is therefore necessary to introduce two additional components to achieve two additional degrees of freedom allowing f2 and f3 to be servocontrolled.

Thus, the beam F'2 passes through an acousto-optical modulator AOM2 intended to modify the frequency thereof (alternatively a phase modulator allowing frequency changes to be achieved by serrodyne modulation may be used), then the transmitted portion is injected into the cavity in the CW propagation direction.

In the absence of rotation, the average value of the frequency offset, denoted Δfa in FIG. 4, is chosen equal to a multiple of the free spectral range FSR. To this average value is also added (via the AOM2) a modulation signal intended to generate the sidebands required to obtain the signal allowing this average value to be servocontrolled so as to place (absence of rotation) or keep (presence of rotation) the frequency of the beam F'2 in resonance with the cavity mode in question. The frequency f'2 of the beam F'2 is then servocontrolled via Δfa to an eigenmode of the cavity the frequency of which is offset from the frequency f'1 by a chosen amount, and respects, taking into account a possible rotation at the angular velocity Ω:

$$f'2 = (N_1+1) \cdot c/L + \Omega/2 \text{ i.e. } \Delta fa = c/L - \Omega/2$$

To do this, the beam 102 described above is detected by a photodiode $PhD_{23}$ (which is the same for both beams F'2 and F'3). It is then processed in the same way as explained for the beam F'1 with the same considerations regarding the choice of the frequency of the local oscillator Osc2 (frequency $f_{m2}$) that modulates AOM2 and serves in the demodulation phase.

An error signal ε2 is thus generated that cancels out when the beam F'2 is resonating with the mode of the cavity.

The procedure is the same with F'3 except that the frequency of the oscillator Osc3 is different from that of the oscillator Osc2 but must meet the same criteria as F'1 and F'2 with respect to the frequency width of the resonant peaks of the cavity and its free spectral range. It is thus possible from the single signal delivered by the photodiode PhD23 to generate two distinct frequency error signals, ε2 and ε3, for F'2 and F'3, respectively.

This signal ε2 is used by the control electronics ER2, for example a PID controller, to control the acousto-optical modulator AOM2 so as to maintain the frequency f'2 of the beam F'2 at resonance with the mode of the cavity. To do this, the aforementioned modulation signal is obtained via the adder S2 and the oscillator Os2, thereby generating sidebands allowing the modulated signal that is detected by the photodiode to be obtained.

Thus, the optical portion DA'o2 of the servocontrol device DA'2 comprises the acousto-optical modulator AOM2 and the electrical portion DA'e2 connected to the output of the photodetector $PhD_{23}$ comprises the phase shifter Dph2, the mixer M2, the oscillator Os2, the adder S2, and the control electronics ER2.

In this system, the acousto-optical modulators are used both to servocontrol the frequency of the corresponding beam (f'2 or f'3) to an eigenfrequency of the cavity, which frequency is different from the frequency f'1 and offset from f'1 by a chosen amount (corresponding to an integer multiple of the FSR that is different for each beam), and to track in real-time the shift in this eigenfrequency due to the rotation Ω. The acousto-optical modulator must therefore be able to create a frequency offset of at least one free spectral range FSR (at least for example N2=N1+1 and N3=N1+2), this introducing a limit on the minimum length of the cavity.

An AOM is typically limited to an offset of about 1 GHz, namely a cavity of a length of 20 cm (taking in this example a cavity made of optical fibre the refractive index of which is 1.5). A cavity of a clearly smaller length would therefore no longer be compatible. In addition, AOMs are bulky and consume a lot of power (typically the RF powers may be of the order of several watts). To produce a sufficiently long cavity, while maintaining, for reasons of bulk, a diameter of a few centimeters to a few tens of centimeters, the optical fibre of the cavity is looped a number of times.

Thus, the presence of acousto-optical modulators in the 3-frequency system of document FR 1302311 makes it incompatible with a "short" cavity.

However a short-cavity optical gyroscope would have a number of advantages:

decrease in the temperature sensitivity of the fibre achieved by decreasing the number of loops;

compatibility with free-space mirror cavities (a single loop), this having the advantage of suppressing the Kerr effect which is a non-linear effect known to limit the precision of fibre gyroscopes whether they be resonant or not;

compatibility with integrated optics, this technology currently being limited to a single loop. Specifically, to produce a number of loops, it would be necessary to produce lossless crossings or indeed a nonplanar integrated optical circuit so that the path allowing the cavity to be closed could pass below or above to avoid crossings. It will also be noted that acousto-optical modulators are at the present time difficult to produce in integrated-optics technology.

One aim of the present invention is to mitigate the aforementioned drawbacks by providing a 3-frequency resonant gyroscope compatible with a short cavity and/or compatible with optical functionalities produced in integrated-optics technology.

SUMMARY OF THE INVENTION

The subject of the present invention is a passive resonant optical gyroscope comprising a cavity and operating with three frequencies, and comprising:

a first injecting laser configured to inject a first optical beam into the cavity in a first direction;

a second injecting laser configured to inject a second optical beam into the cavity in a direction opposite the first direction;

a third injecting laser configured to inject a third optical beam into the cavity in one of the two aforementioned directions, one laser amongst one of the injecting lasers, which is selected as master laser, having a master frequency, the two other injecting lasers, which are respectively denoted the first and second slave lasers, respectively having a first and a second slave frequency;

a master servocontrol device configured to directly servocontrol the master frequency to an eigenfrequency corresponding to a resonant mode of the cavity or to servocontrol an eigenfrequency corresponding to a resonant mode of the cavity to the master frequency of the master laser;

a first servocontrol stage comprising a first and a second slave device that are configured to respectively generate a first frequency and a second frequency error signal having a minimum absolute value when the first and second slave frequencies each correspond to a resonant mode of the cavity, respectively; and a second servocontrol stage comprising a first optical phase-locking device and a second optical phase-locking device respectively comprising a first and a second slave oscillator that are configured to generate a first and a second radiofrequency offset signal, said first and a second optical phase-locking device being configured to respectively make coherent the first slave laser with the master laser and the second slave laser with the master laser and to servocontrol the first and the second slave frequency to resonant modes of the cavity that are different from the resonant mode corresponding to the master frequency, each radiofrequency offset signal of the second servocontrol stage being determined from the corresponding frequency error signal of the first servocontrol stage.

Preferably, the gyroscope according to the invention furthermore comprises:

a first photodetector configured to receive one or more optical beams obtained from the one or more optical beams injected in the first direction and at least one portion of which has made at least one pass through the cavity; and a second photodetector configured to receive the one or more optical beams obtained from the one or more optical beams injected in the second direction and at least one portion of which has made at least one pass through the cavity, said photodetectors being configured to generate three electric signals from the three received optical beams, each electric signal being sent to the master servocontrol device or to the corresponding first or second slave device.

According to one embodiment, the master servocontrol device comprises:

a master phase modulator for modulating the optical beam of the master laser;

a master demodulating device connected to the corresponding output of the photodetector: a master phase shifter, a master oscillator operating at a preset master oscillation frequency that is also used by the master phase modulator, and a master mixer for mixing the signals output by the master oscillator and master phase shifter, a master frequency error signal being obtained from the signal output by the master mixer; and master control electronics configured to generate a correction signal from the master frequency error signal, and to directly control the master frequency of the master laser or a length of the cavity, the frequency of the master laser remaining constant.

According to one embodiment, the master phase modulator consists of an electric signal that directly modulates the supply current of the master laser at the preset master oscillation frequency.

Advantageously, the master servocontrol device is a Pound-Drever-Hall type device.

According to one embodiment, each slave device of the first servocontrol stage comprises:

a phase modulator for modulating the optical beam of the corresponding slave laser;

a demodulating device connected to the output of the photodetector having detected the corresponding optical beam, and comprising a phase shifter, an oscillator operating at a preset oscillation frequency that is also used by the corresponding phase modulator, and a mixer for mixing the signals output by the oscillator and phase shifter, the frequency error signal being obtained from the signal output by the mixer; and control electronics configured to generate a correction signal from the frequency error signal.

Advantageously, the phase modulator consists of an electric signal that directly modulates the supply current of the corresponding slave laser at the preset oscillation frequency.

According to one embodiment, the first and second optical phase-locking device respectively comprise a third photodetector and a fourth photodetector that is configured to respectively generate a first beat signal and a second beat signal, respectively between an optical beam output by the master laser and an optical beam output by the first slave laser, and between an optical beam output by the master laser and an optical beam output by the second slave laser.

Advantageously, each radiofrequency offset signal has a tunable reference frequency and a reference phase, and each optical phase-locking device is configured to control the frequency of the corresponding slave laser so as to servocontrol the beat signal to the radiofrequency offset signal, the reference frequency being made equal to an integer number of free spectral ranges of the cavity using a correction signal obtained from the corresponding frequency error signal, each slave frequency then respectively being offset from the master frequency by a value corresponding to the corresponding reference frequency.

Advantageously, the integer number is such that the corresponding reference frequency is comprised in a passband of the corresponding third or fourth photodetector.

According to one embodiment, each optical phase-locking device comprises a mixer configured to convert a frequency of the beat signal into a converted frequency in the radiofrequency domain, the servocontrol being carried out on the basis of the converted frequency.

Preferably, each optical phase-locking device comprises, to achieve the servocontrol of the beat signal to the radiofrequency offset signal:

a phase comparator configured to compare respectively a phase of the beat signal or of the converted signal and the phase of the radiofrequency offset signal, the comparator being configured to generate a phase error signal; and control electronics configured to generate a correction signal and to control the slave frequency of the slave laser on the basis of the phase error signal.

According to one variant, the first and second photodetectors are configured to receive optical beams that are at least partially reflected by the cavity.

According to another variant, the first and second photodetectors are configured to receive optical beams transmitted by the cavity.

According to one embodiment, an optical block comprising the paths of the optical beams and the optical components required to implement the gyroscope according to the invention is produced in the form of at least one photonic integrated circuit.

BRIEF DESCRIPTION OF THE DRAWINGS

Other features, aims and advantages of the present invention will become apparent on reading the following detailed description and with reference to the appended drawings, which are given by way of nonlimiting examples and in which.

DETAILED DESCRIPTION OF THE INVENTION

Figure 5:
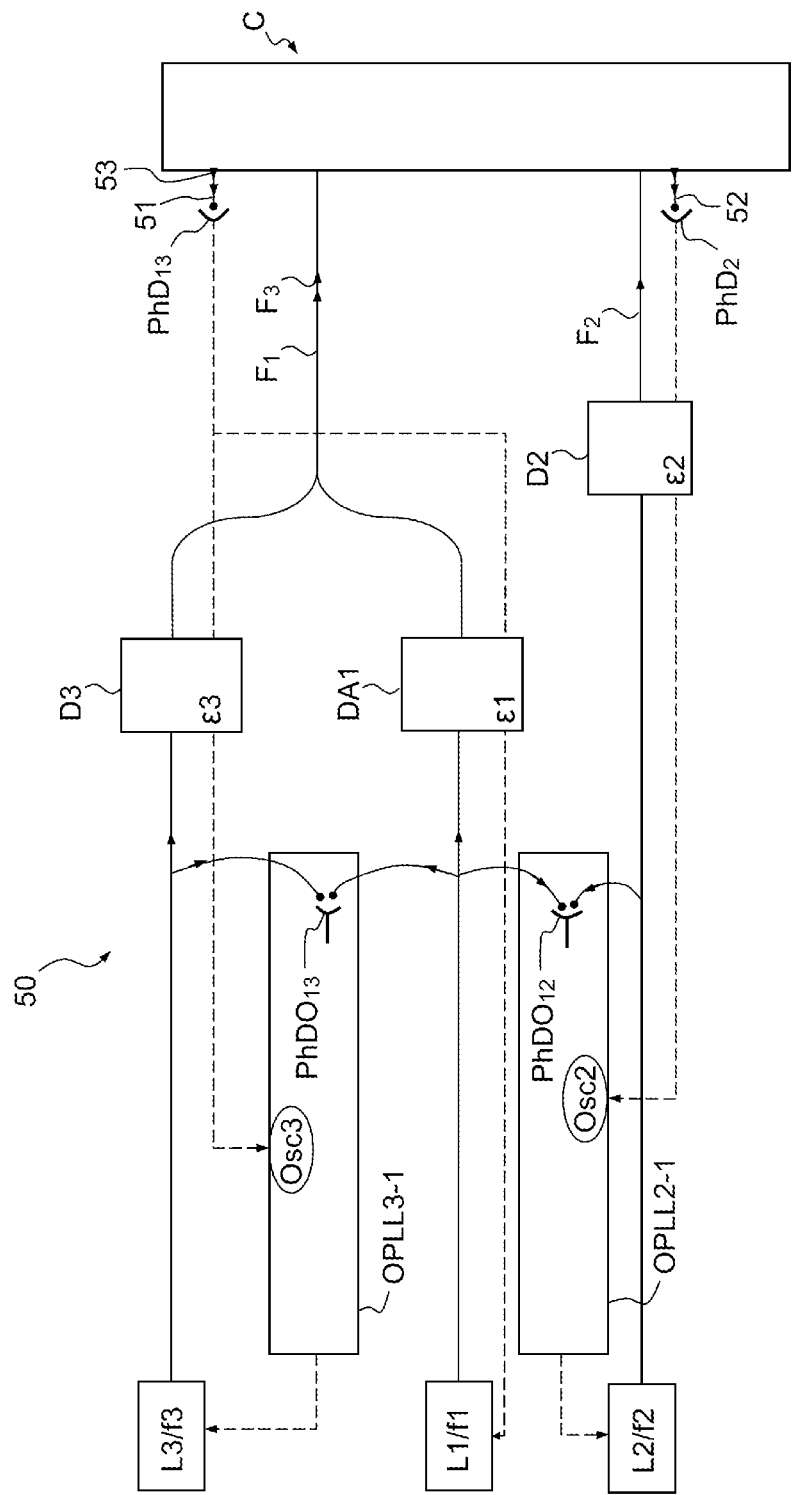
FIG. 5 illustrates a passive resonant optical gyroscope 50 operating with 3 frequencies according to the invention.

FIG. 5 illustrates a passive resonant optical gyroscope 50 operating with 3 frequencies according to the invention. To simplify the description, the means for measuring $\Delta fp$ and $\Delta f_{1-2}$ (see the prior art) have not been shown.

Here, the method for obtaining 3 suitable frequencies will be described.

The 3-frequency gyroscope 50 comprises a cavity C of length L. It comprises a first injecting laser L1 configured to inject a first optical beam F1 into the cavity in a first direction, a second injecting laser L2 configured to inject a second optical beam F2 into the cavity in a direction opposite the first direction, and a third injecting laser L3 configured to inject a third optical beam F3 into the cavity in one of the two aforementioned directions.

In the nonlimiting example in FIG. 5, the beams F1 and F3 are injected in the CW direction and the beam F2 is injected in the CCW direction.

One laser amongst one of the injecting lasers L1, L2 and L3 is chosen as master laser, in the example it is L1 but any of the three lasers may be chosen as master laser. The master laser has a master frequency, here f1.

The two other injecting lasers are respectively denoted first slave laser, L2 in the example in FIG. 5, and second slave laser, L3 in the example in FIG. 5. The first slave laser has a first slave frequency f2 in the example in FIG. 5, and the second slave laser L3 has a second slave frequency, f3 in the example in FIG. 5. In the rest of the description, the explanations are given with L1 as master laser and L2 and L3 as slave lasers, but the invention applies identically for any other choice of the master laser and slave lasers.

The gyroscope 50 according to the invention also comprises a master servocontrol device DA1 configured to directly servocontrol the master frequency f1 to an eigenfrequency of the cavity. The servocontrol is carried out in a conventional way, as for example described in the prior art, on the basis of the frequency error signal $\varepsilon 1$.

Figure 1:
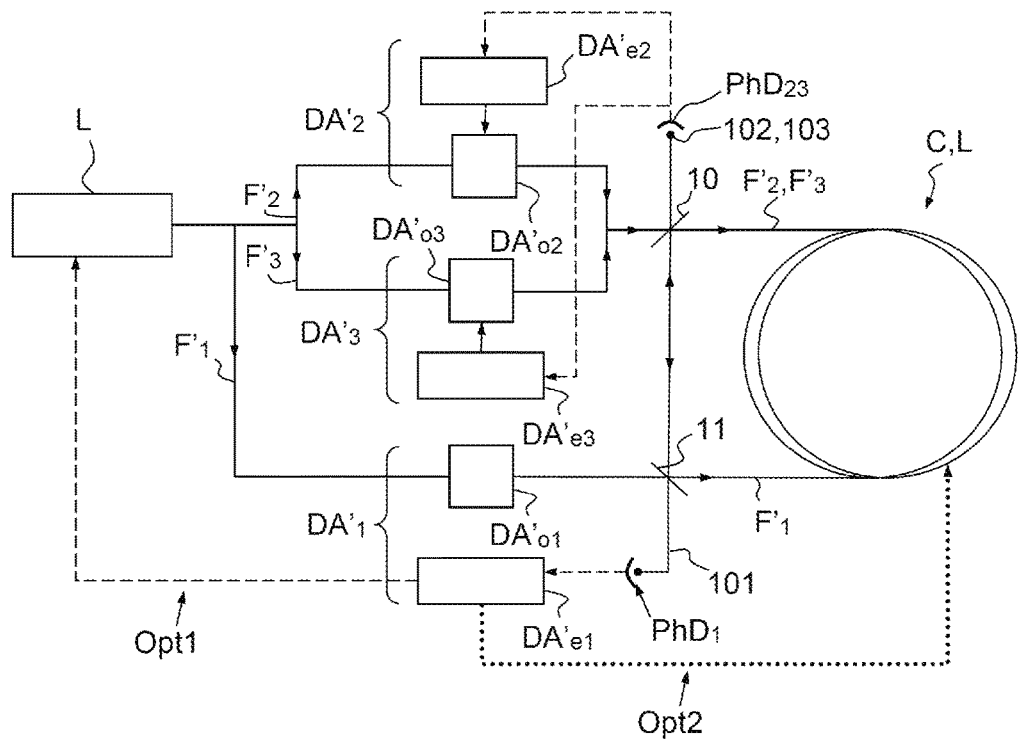
FIG. 1, already cited, illustrates the architecture of a 3-frequency passive resonant gyroscope according to the prior art.
Figure 2:
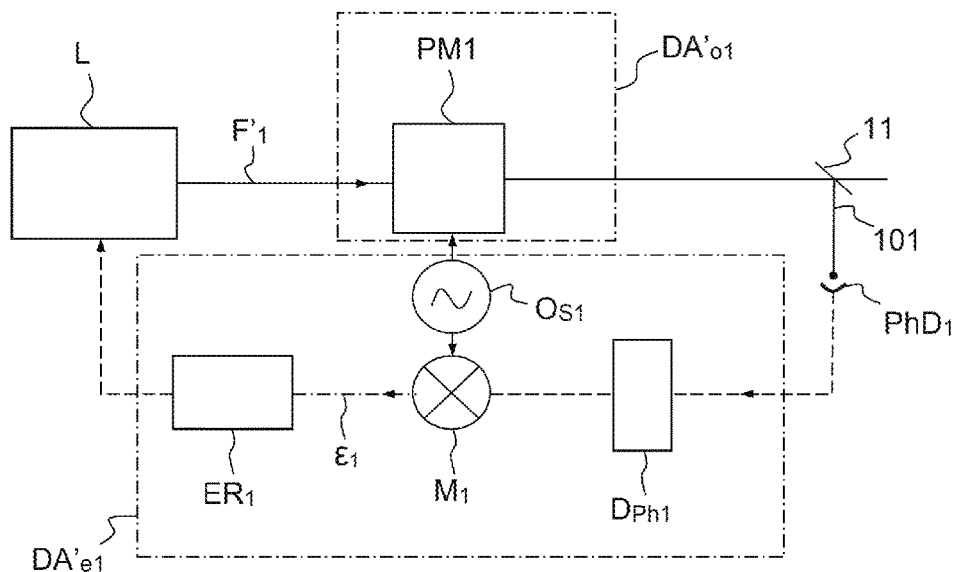
FIG. 2, already cited, illustrates a 3-frequency passive resonant gyroscope according to the prior art with direct servocontrol of the laser corresponding to one of the frequencies.

According to a first option, the error signal $\varepsilon 1$ is used to change the frequency of the master laser by acting on the available input (for example a modulation of the current for a semiconductor laser), the servocontrol controlling the frequency of the laser directly so that it corresponds to a resonant mode of the cavity, as illustrated in FIG. 5 (see also FIG. 2).

Figure 3:
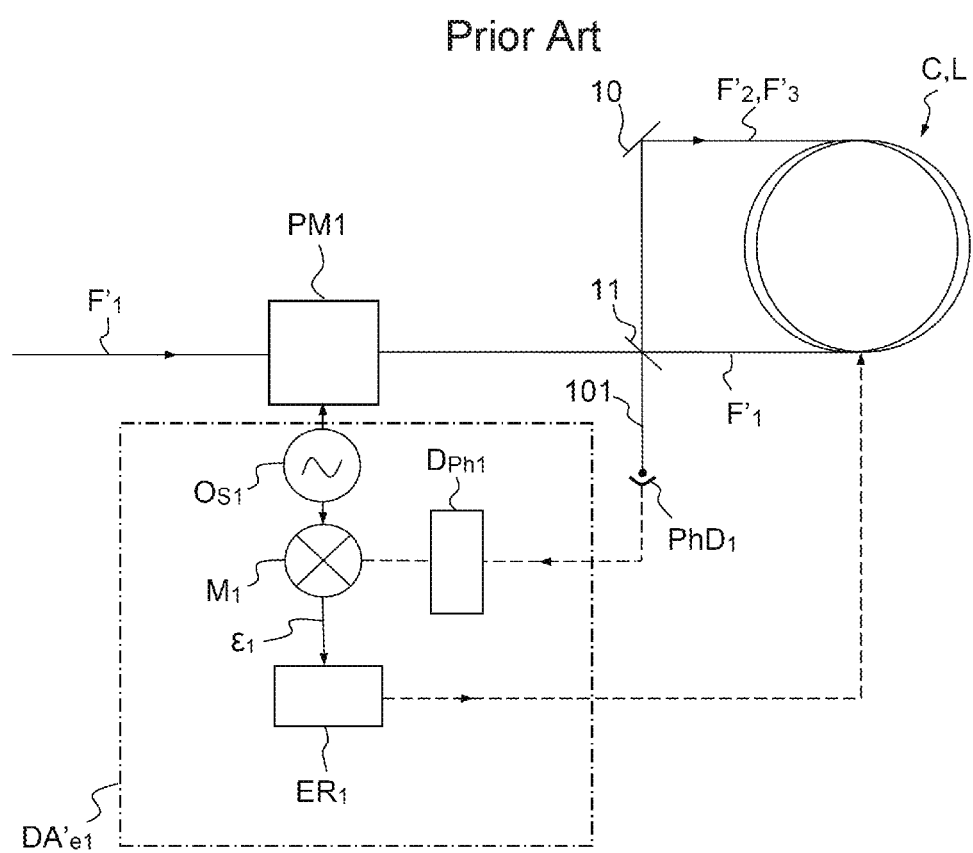
FIG. 3, already cited, illustrates a 3-frequency passive resonant gyroscope according to the prior art with servocontrol of the length of the cavity, the frequency of the laser remaining constant.
Figure 4:
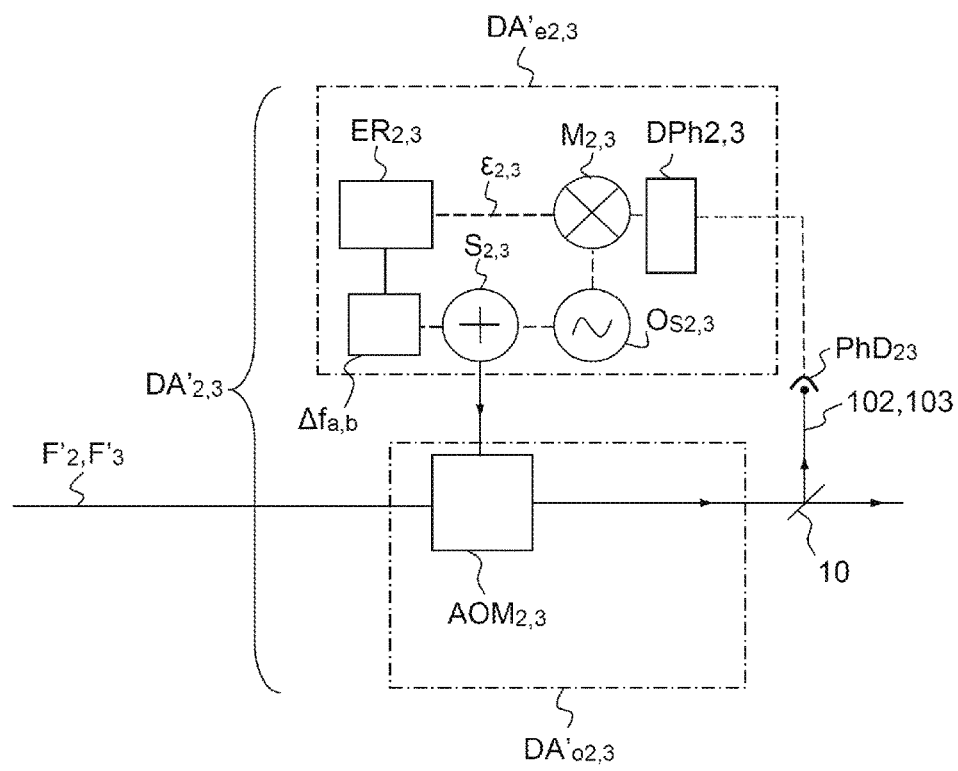
FIG. 4, already cited, illustrates the servocontrol of the two other frequencies.

According to a second option, the error signal $\varepsilon 1$ is used to modulate the length of the cavity via a piezoelectric transducer (for example for a fibre laser), in order to servocontrol an eigenfrequency corresponding to a resonant mode of the cavity to the frequency of the master laser, which remains constant (see FIG. 3).

The gyroscope 50 according to the invention furthermore comprises a first servocontrol stage comprising a first slave device, D2 in the example, associated with the first slave laser and a second slave device, D3 in the example, associated with the second slave laser. The first slave device D2 is configured to generate a first frequency error signal, $\varepsilon 2$ in the example of FIG. 5, having a minimum absolute value when the first slave frequency f2 corresponds to a resonant mode of the cavity. The second slave device D3 is configured to generate a second frequency error signal, $\varepsilon 3$ in the example of FIG. 5, having a minimum absolute value when the second slave frequency f3 corresponds to a resonant mode of the cavity. Typically, the frequency error signals are obtained by the conventional means described in the prior art. These error signals allow the deviation of the frequency of the slave lasers from resonance to be quantified and are used by a second servocontrol stage of the gyroscope 50 according to the invention.

The second servocontrol stage comprises a first optical phase-locking device OPLL2-1 comprising a first oscillator Osc2 (associated with the first slave laser L2) configured to generate a first radiofrequency offset signal, the first optical phase-locking device OPLL2-1 being configured to make the first slave laser L2 coherent with the master laser L1 and to servocontrol the first slave frequency f2 to a resonant mode of the cavity that is different from the resonant mode corresponding to the master frequency f1. Typically the radiofrequency offset signal has a frequency comprised between a few tens of MHz, for cavities based on optical fibres, up to several tens of GHz for miniature integrated-optics cavities, the maximum offset in any case being limited by the maximum passband of the detectors (typically between 40 and 100 GHz at 1.5 µm).

The second servocontrol stage also comprises a second optical phase-locking device OPLL3-1 comprising a second oscillator Osc3 (associated with the second slave laser L3) configured to generate a second radiofrequency offset signal, the second optical phase-locking device OPLL3-1 being configured to make the second slave laser L3 coherent with the master laser L1 and to servocontrol the second slave frequency f3 to a resonant mode of the cavity that is different from the resonant mode corresponding to the master frequency f1. The master laser L1 is therefore the laser directly servocontrolled to the cavity and serves as reference laser to which the two other lasers i.e. the lasers denoted slave lasers, are phase looped. The invention therefore uses two optical phase-locking devices (denoted OPLL, for optical phase-locked loop) to make the slave lasers coherent with the master laser and to make the two slave lasers lase at resonant frequencies of the cavity C.

To do this, each radiofrequency offset signal of the second servocontrol stage is determined from the corresponding frequency error signal $\varepsilon 2$, $\varepsilon 3$ of the first servocontrol stage. In other words, for each slave laser, the gyroscope according to the invention uses the frequency error signal generated by the first servocontrol stage to control the oscillator of the corresponding phase-locked loop. The operation of an OPLL loop and particular embodiments of implementation of the two OPLL loops of the gyroscope according to the invention are described in detail below.

This architecture has the advantage, with respect to the 3-frequency architecture of the prior art, of no longer requiring the acousto-optical modulators. It will be recalled that these modulators allowed, from a single laser, three beams at different frequencies to be obtained, each however in resonance with the cavity. The gyroscope according to the invention comprises three independent lasers that are made coherent with one another while ensuring that they each have a different frequency and are in resonance with the cavity. By virtue of the use of these three independent lasers, it is possible to obtain much larger frequency differences than with acousto-optical modulators and also to improve compactness.

The coherence relationships between the beams are obtained and controlled by the OPLL. The frequency error signals $\varepsilon 2$ and $\varepsilon 3$ respectively allow the frequency of the oscillator of the OPLL2-1 (between the beam F1 and the beam F2) and the frequency of the oscillator of the OPLL3-1 (between the beam F1 and the beam F3) to be servocontrolled so that the first slave laser L2 and the second slave laser L3 are respectively in resonance.

Preferably, the gyroscope 50 according to the invention also comprises a first photodetector PhD13 configured to receive one or more optical beams obtained from the one or more optical beams injected in the first direction and at least one portion of which has made at least one pass through the cavity, and a second photodetector PhD2 configured to receive one or more optical beams obtained from the optical beams injected in the second direction and at least one portion of which has made at least one pass through the cavity.

These photodetectors may be placed in a number of locations with respect to the cavity depending on the type of cavity and of the type (reflected or transmitted) of optical beam being collected, as described below. In the example of FIG. 5, the detector PhD13 receives the beams 51 and 53 obtained from the beams F1 and F3 injected in the CW direction, and the detector PhD2 receives the beam 52 obtained from the beam injected F2 in the CCW direction.

The photodetectors PhD13 and PhD2 are configured to generate three electric signals from the 3 detected optical signals 51, 52 and 53.

The detector PhD13 detects the two signals 51 and 53, which are liable to beat together, but the demodulating step then carried out on each of the electric signals makes it possible to isolate only the signal of interest.

Each electric signal is sent to the corresponding device. In the example, the electric signal obtained from the optical beam 51 (F1) forms the input of the master servocontrol device DA1; the electrical signal obtained from the optical beam 52 (F2) forms the input of the second slave device D2; and the electrical signal obtained from the optical beam 53 (F3) forms the input of the first slave device D1.

Figure 6:
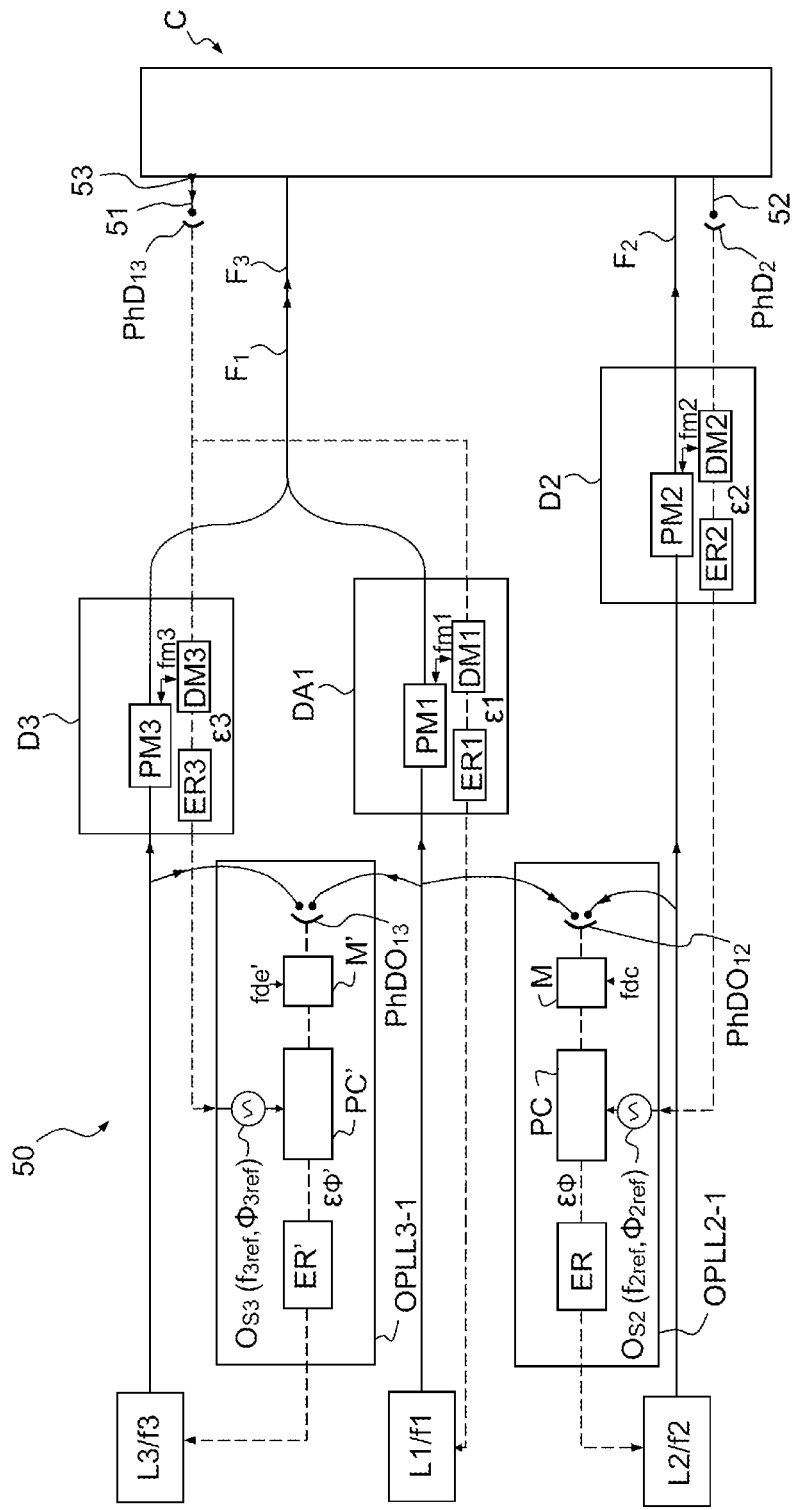
FIG. 6 illustrates one embodiment of the gyroscope 50 according to the invention and more particularly details the various components used.

FIG. 6 illustrates one embodiment of the gyroscope 50 according to the invention and more particularly details the various components used.

Advantageously, the master servocontrol device DA1 is of the type described in the prior art with reference to FIGS. 2 and 3. It comprises a master phase modulator PM1 for modulating the optical beam output by the master laser L1 and a master demodulating device DM1 that acts on the electrical signal output by the corresponding photodetector PhD13. The device DM1 comprises a master phase shifter, a master oscillator Osc1 operating at a preset master oscillation frequency fm1 that is also used by the master phase modulator and a master mixer for mixing the signals output by the master oscillator and the master phase shifter, the master frequency error signal $\varepsilon 1$ being obtained from the signal output by the master mixer. The device DA1 also comprises master control electronics ER1 configured to generate a correction signal from the master frequency error signal $\varepsilon 1$, and to directly control the master frequency f1 of the master laser L1 or to control the length L of the cavity, the frequency of the master laser remaining constant.

Advantageously, the master servocontrol device DA1 is a Pound-Drevor-Hall type device.

According to one variant, the master phase modulator consists of an electric signal that directly modulates the supply current of the master laser L1 at the preset master oscillation frequency fm1. Therefore, when for example the master injecting laser L1 is a laser diode, a direct modulation of the current of the laser L1 at the given frequency fm1 is used to generate the sidebands, instead of a phase modulator component PM1.

FIG. 6 also describes an example of slave devices D2 and D3. These devices have an architecture that is substantially identical to that of the master servocontrol device DA1.

Advantageously, each slave device D2 or D3 of the first servocontrol stage comprises:

a phase modulator PM2 or PM3 for modulating the optical beam F2 or F3 of the corresponding slave laser L2 or L3.

According to one variant, the phase modulator consists of an electrical signal that directly modulates the supply current of the corresponding slave laser L2, L3, at the preset oscillation frequency fm2, fm3.

Thus, instead of the phase modulator components PM2 and/or P3, to generate the sidebands, a direct modulation of the current of the lasers L2 and L3 at the same frequencies fm2, fm3 is used, when for example the injecting lasers L2 and L3 are laser diodes.

Each slave device of the first servocontrol stage also comprises a demodulating device DM2 or DM3 connected to the output of the photodetector having detected the corresponding optical beam, 52 detected by PhD2 or 53 detected by PhD13. Each demodulating device comprises a phase shifter, an oscillator operating at a preset oscillation frequency fm2 or fm3 that is also used by the corresponding phase modulator, and a mixer for mixing the signals output by the oscillator and phase shifter, the frequency error signal ε2 or ε3 being obtained from the signal output by the mixer;

control electronics ER2 or ER3 configured to generate a correction signal from the frequency error signal ε2, ε3.

The error signals ε2, ε3 are not used to directly servo-control the frequency of the corresponding laser L2, L3 to a mode of the cavity. They are used by way of correction signal to set the frequency of the radiofrequency offset signal, as explained below.

We will now describe the second servocontrol stage, which is based on the OPLL principle.

Figure 7:
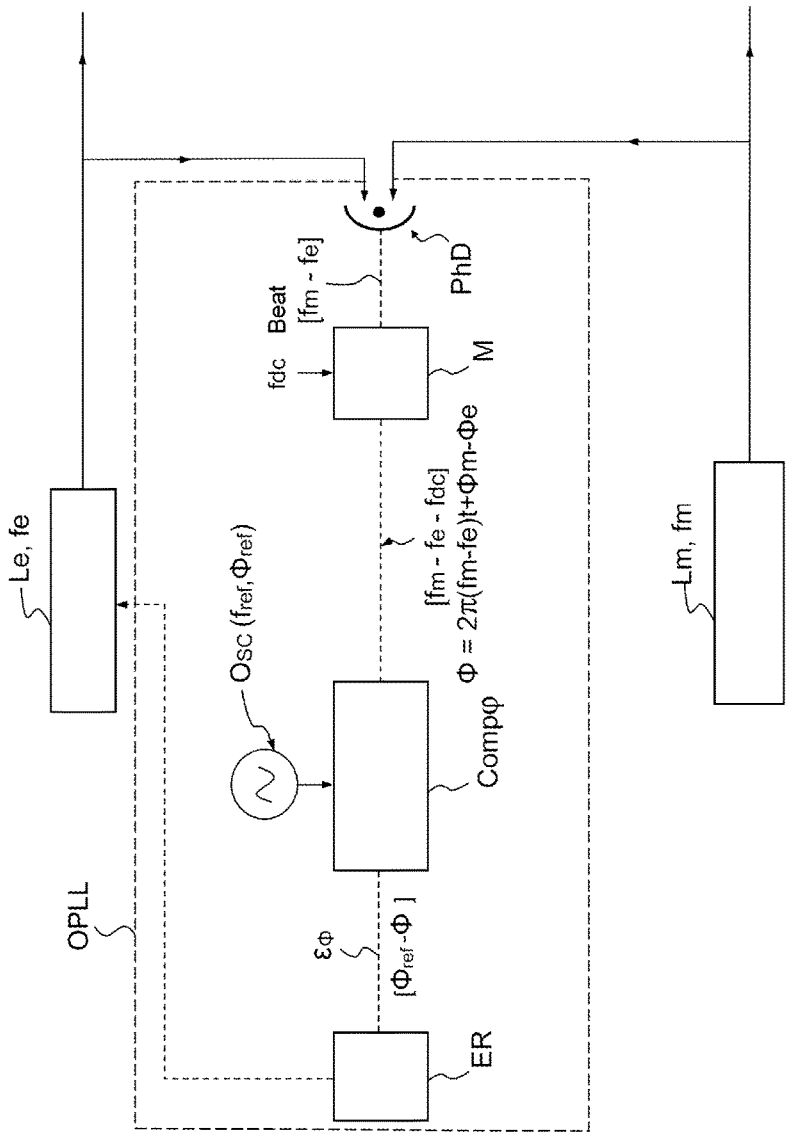
FIG. 7 illustrates the underlying principle of servocontrol based on an optical phase-lock loop.

OPLLs are based on phased-locked loops, or PLLs, and are able to modify the relative phase of two optical beams by transposition to an electrical signal. The principle of such a servocontrol is as illustrated in FIG. 7.

It is sought to servocontrol a slave frequency fe of a slave laser Le to the master frequency fm of a master laser.

It will be recalled that the frequency of a signal f is proportional to the derivative of the phase φ of the signal with respect to time. Making the phase difference between a slave signal to be servocontrolled and a reference signal for example zero allows a slave frequency fe to be servocontrolled to the master frequency fm.

In other words, an OPLL is configured to carry out the servocontrol on the basis of an error signal $\varepsilon_\varphi$ that depends on a phase difference between on the one hand the fm−fe beat between the master frequency and the slave frequency and on the other hand a reference signal having a predefined reference frequency fref.

According to one preferred embodiment, the phased-locked loop OPLL comprises a photodiode PhD that detects the optical beams output by the master and slave laser, and more particularly the beat signal between these frequencies, of frequency fm−fe. The frequency of the slave laser fe is servocontrolled to the frequency of the master laser fm (itself directly servocontrolled to a resonant mode of the cavity of the gyroscope), on the basis of this fm−fe beat that it is desired to adjust to a preset value.

When the beat frequency between the two lasers is typically of the order of magnitude of a gigahertz, the comparison of the phases of these signals is very complex to implement. The beat frequency fm−fe is then converted into a converted signal of lower frequency fm−fe−fdc using a mixer M, this operation being referred to as a down conversion. The aim is to make the frequency of the signal to be servocontrolled compatible with the operating range of the phase comparator Compφ. The obtained signal of frequency fm−fe−fdc and of phase φ=2π(fm−fe−fdc)t+φm−φe (it is assumed that the oscillator at the frequency fd to use the down conversion has a sufficiently stable phase to not be taken into account) typically has a frequency comprised between 1 and 500 MHz. Preferably a filter is added after the mixer in order to select only the signal of interest of frequency fm−fe−fdc in the desired range.

The OPLL loop also comprises a reference oscillator Osc configured to generate a radiofrequency offset signal having a radio reference frequency fref and a reference phase φref.

Next, the phase comparator Compφ generates an error signal $\varepsilon_\varphi$ that depends on the phase difference φ−φref between the converted signal and the radio reference signal.

Lastly, an electronic control device ER generates a correction signal and controls the slave frequency fe of the slave laser so as to minimise the error signal $\varepsilon_\varphi$. In the case of a laser diode DFB, typically the supply current of the laser is controlled, optical frequency depending on the current.

Typically on turn on, after a certain length of time, the frequency of the converted beat signal locks to the chosen frequency fref of the oscillator, with fm−fe−fdc=+/−fref The slave laser then has a slave frequency equal to the master frequency shifted by the reference frequency and the down conversion frequency.

Thus, when two optical beams output by two sources are made to beat on a photodetector, and their frequencies are close enough to lie within the passband of the detector, a sinusoidal beat signal is obtained the duration, frequency stability, phase stability and amplitude of which depend on the degree of coherence between the two sources. The more the sources are coherent (their intensities are assumed to remain constant), the more this beat signal resembles a sinusoidal signal generated by an electric generator, with small fluctuations in the frequency and phase (few discontinuities, jumps, or transient divergences from a sinusoid).

The objective of an OPLL is to servocontrol the beat signal between two lasers, this signal optionally being down shifted to a frequency domain accessible to phase comparators, to a reference (and therefore very stable) oscillator, the radiofrequency offset signal, so that this beat signal is a sinusoid that is as stable as possible of that delivered by the reference oscillator (the down conversion signal is assumed to be sufficiently stable to not be taken into account).

Once this regime has been achieved, the two lasers, which were precedingly independent, have a coherency relationship one with the other.

The gyroscope according to the invention uses, in an original way, two optical phase-locked loops. The coherence relationship between the three injecting lasers of the gyroscope is obtained by virtue of two optical phase-locked loops, one between the master laser and a first slave, and another between the master laser and a second slave.

Preferably, to collect the beat signals, the first optical phase-locking device OPLL2-1 comprises a third photodetector PhDO12 that receives the optical beams output by the master laser L1 and the first slave laser L2 and that generates a first electrical beat signal from the received optical beams. Likewise, the second optical phase-locking device OPLL3-1 comprises a fourth photodetector PhDO13 that receives the optical beams output by the master laser L1 and the second slave laser L3 and that generates a second electrical beat signal from the received optical beams.

In addition, if for each OPLL the reference oscillator is tunable, and one of the two lasers (the master laser) is servocontrolled to a resonance of the cavity, then it is possible to tune the frequency of the reference oscillator so that the frequency of the beat signal between the two beams (which is ideally a sinusoidal signal maintained by the OPLL) corresponds to an integer number of FSRs of the cavity. The slave laser then also lases into a resonant mode of the cavity, this mode being different from the resonant mode of the master laser.

Thus, advantageously the first radiofrequency offset signal has a tunable first reference frequency f2ref and a reference phase φ2ref and the first optical phase-locking device OPLL2-1 is configured to control the frequency f2 of the first slave laser L2 so as to servocontrol the first beat signal, optionally converted to the low-frequency domain, to the first radiofrequency offset signal, the first reference frequency f2ref without down conversion or the sum of the first reference frequency f2ref and the down-conversion frequency fdc in the contrary case being made equal to an integer number n1 of free spectral ranges FSRs of the cavity using the correction signal obtained from the first frequency error signal ε2 delivered by the first servocontrol stage.

Likewise, the second radiofrequency offset signal has a tunable second reference frequency f3ref and a reference phase φ3ref and the second optical phase-locking device OPLL3-1 is configured to control the frequency f3 of the second slave laser L3 so as to servocontrol the second beat signal, optionally converted to the low-frequency domain, to the second radiofrequency offset signal, the second reference frequency f3ref without down conversion or the sum of the second reference frequency f3ref and the down conversion frequency fdc' in the contrary case being made equal to an integer number n2 of free spectral ranges FSRs of the cavity using the correction signal obtained from the second frequency error signal ε3 delivered by the first servocontrol stage.

When the frequencies are locked and in the absence of rotation, the slave frequency f2 is offset from the master frequency f1 by a value corresponding to the reference frequency f2ref+fd=n1·FSR.

$$f2-f1=+/-(f2\text{ref}+fd)=+/-n1\cdot\text{FSR}.$$

Likewise, the slave frequency f3 is offset from the master frequency f1 by a value corresponding to the reference frequency f3ref+fd=n2·FSR.

$$F3-f1=+/-(f3\text{ref}+fd)=+/-n2\cdot\text{FSR}.$$

When the gyroscope experiences an angular rotation, the resonant frequencies vary as a function of time. The operation of the servocontrol may be likened to that of a looped system the operating point of which is changed to ensure the resonances are tracked.

One embodiment of the OPLLs is described in FIG. 6.

Each optical phase-locking device OPLL2-1 (OPLL3-1) comprises, to achieve the servocontrol of the beat signal to the radiofrequency offset signal:

a phase comparator PC (PC') configured to compare a phase φ2 (φ3) of the beat signal or of the converted signal and the phase φ2ref (φ3ref) of the corresponding radiofrequency offset signal, the comparator being configured to generate a phase error signal εφ (εφ');

control electronics ER (ER) configured to generate a correction signal and to control the slave frequency f2 (f3) of the slave laser L2 (L3) on the basis of the phase error signal εφ (εφ').

With respect to the use of a single laser and acousto-optical modulators, a 3-laser gyroscope is obtained in which:
the coherence relationships between the beams are obtained and controlled by the OPLLs;
the differences between the frequencies of the three beams, allowing the frequency of each beam to be servocontrolled so as to obtain (absence of rotation) or preserve (presence of rotation) their resonance, are controlled by controlling the frequency of the reference oscillator of each of the OPLLs;
the error signal ε1 allows as above the laser L1 to be servocontrolled to the cavity or vice versa;
the error signals ε2 and ε3 allow the frequency f2ref of the oscillator of the OPLL1-2 and the frequency f3ref of the OPLL1-3 to be respectively servocontrolled so that L2 and L3 are in resonance.

To ensure correct operation of the OPLLs the integer numbers n1, n2 and the down-conversion frequencies fdc and fdc' are such that the corresponding reference frequencies f2ref, f3ref are comprised in a passband of the corresponding photodetector.

According to one embodiment illustrated in FIG. 6, a down conversion is necessary and in this case each optical frequency-locking device OPLL1-2 (OPLL1-3) comprises a mixer M (M') configured to convert a frequency of the beat signal f2-f1 (f3-f1) into a converted frequency f2-f1-fdc (f3-f1-fdc) in the radiofrequency domain, the servocontrol being carried out on the basis of the converted frequency.

Typically each converted frequency is comprised between 1 and 500 MHz. Such a frequency is compatible with a phase comparator produced in integrated-optics technology.

According to one variant a filter is connected to the output of each mixer.

The operation of the gyroscope according to the invention may be based on various optical signals 51, 52, 53 received by the first and second detectors PhD13 and PhD2. According to a first embodiment illustrated in FIGS. 8 and 9, the first and second photodetector are configured to receive optical beams 51, 52, 53 corresponding to the optical beams at least partially reflected by the cavity. When the reflected intensities are used, the latter are maximal off resonance and minimal at resonance and the servocontrol is adapted accordingly. In the case where the gyroscope is optical fibre based (FIG. 9), circulators Circ and Circ' are inserted on the path of the optical beams in order to well separate the reflected beams from the incident beams. The use of reflected beams to deliver the error signals ε1, ε2 and ε3 is the most optimal, because in this case the maximum value of the modulation frequency of PM1, PM2 and PM3 is limited only by the free spectral range FSR.

Figure 10:
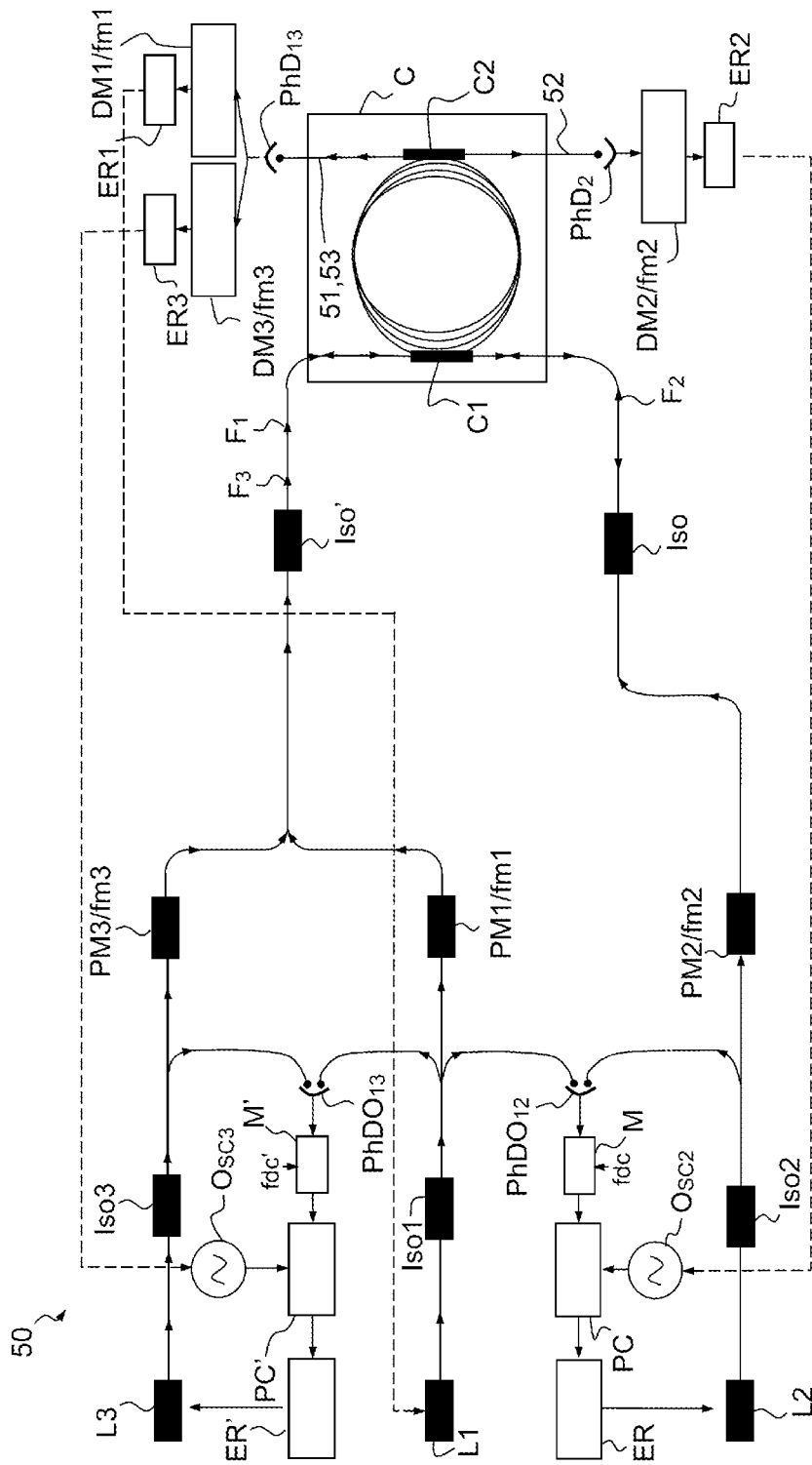
FIG. 10 schematically shows one embodiment of the gyroscope according to the invention, in which the first and second photodetector are configured to receive optical beams corresponding to optical beams transmitted by the cavity.

According to a second body embodiment illustrated in FIG. 10, the first and second photodetector are configured to receive optical beams 51, 52, 53 corresponding to the optical beams transmitted by the cavity. When the transmitted intensities are used, the latter are minimal off resonance and maximal at resonance and the servocontrol is adapted accordingly. One advantage is that, lasers generally comprising isolators, the presence of the isolators Iso and Iso' is not indispensable, and the production of the cavity C and of the couplers C1 and C2 is compatible with an implementation in integrated optics.

The gyroscope according to the invention is also compatible with any type of cavity: free-space cavities, hollow-fibre cavities, integrated-optics resonators, etc.

Figure 8:
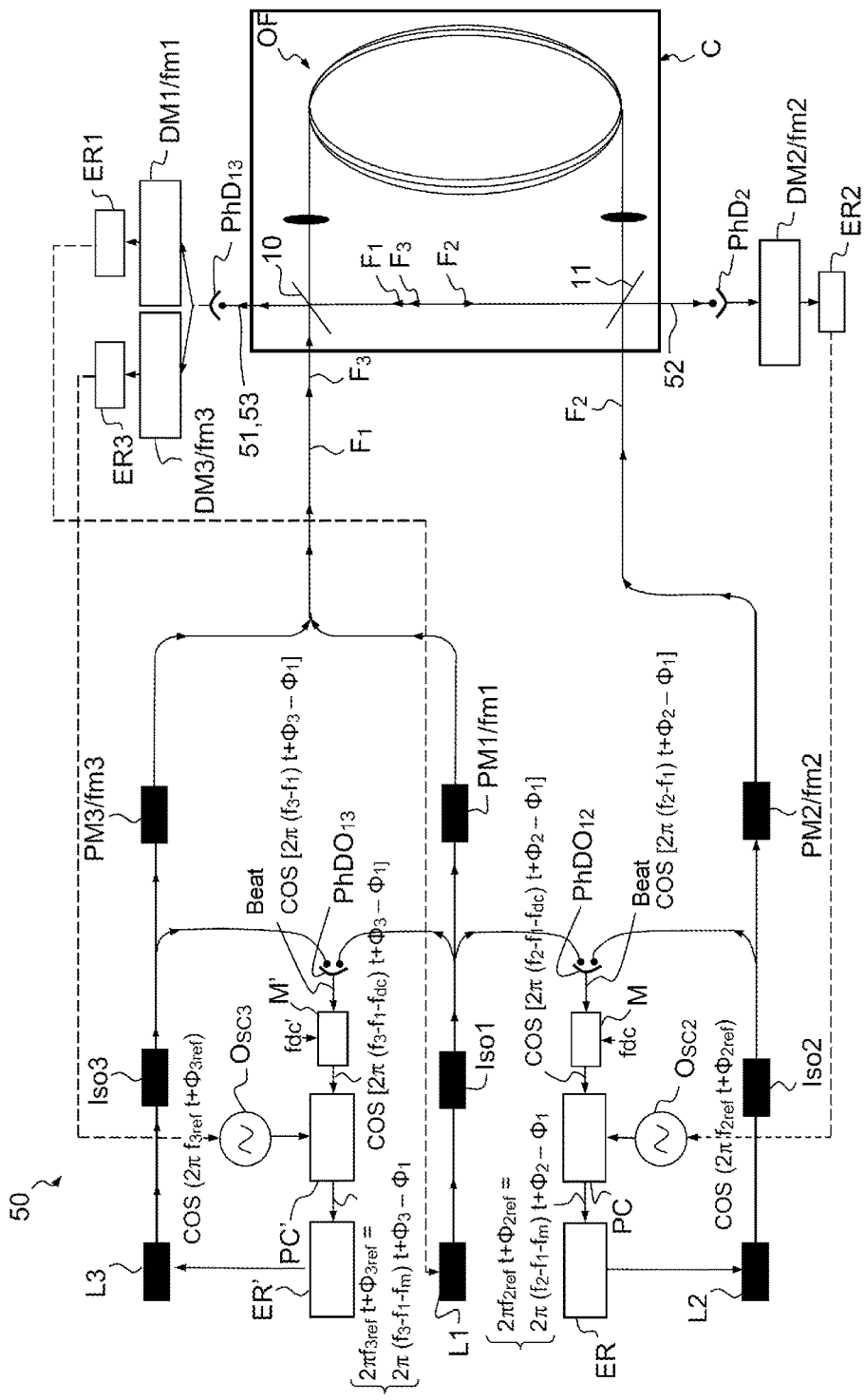
FIG. 8 schematically shows one embodiment of the gyroscope according to the invention the cavity of which comprises two free-space couplers and one optical fibre.

According to one embodiment, the cavity C of the gyroscope 50 comprises two free-space couplers 10, 11, the rest of the cavity for example being in free space (mirrors) or comprising an optical fibre OF such as illustrated in FIG. 8.

Figure 9:
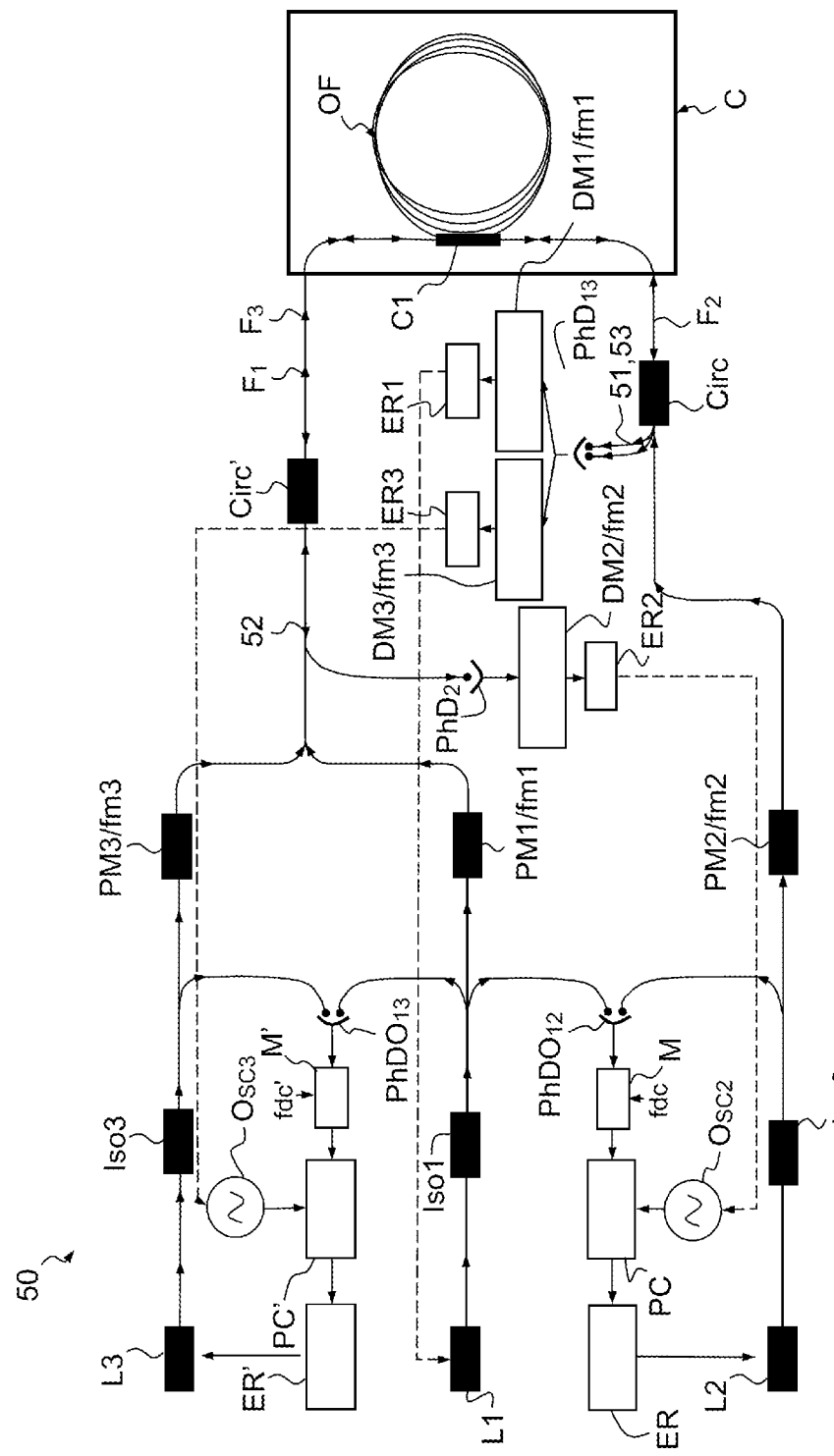
FIG. 9 schematically shows one embodiment of the gyroscope according to the invention, said gyroscope being particularly well suited when the cavity consists of an optical fibre.

Another embodiment illustrated in FIG. 9 is particularly suitable when the cavity consists of an optical fibre OF. The cavity comprises, apart from the optical fibre OF, a first 2-by-2 coupler C1, this first coupler being configured to inject the optical beams F1, F2, F3 into the cavity and to direct the optical beams 51, 52, 53 reflected by the cavity towards the first and second photodetector PhD13, PhD2.

According to another embodiment, the fibre-based cavity comprises a first 2-by-2 coupler C1 and a second 2-by-2 coupler C2, the first coupler C1 being configured to inject the optical beams F1, F2, F3 into the cavity, the second coupler C2 being configured to direct the optical beams 51, 52 and 53 transmitted by the cavity towards the first and second photodetector PhD13, PhD2.

A nonlimiting numerical example of the gyroscope 50 is given below.

Semiconductor or fibre-optic injecting lasers L1, L2 and L3 emitting at a wavelength of 1.55 μm are for example considered. A 5 cm-long cavity with a refractive index of 1.6 is considered, i.e. a cavity with an FSR of 3.75 GHz, the cavity being produced in integrated-optics technology (in this example from $Si_3N_4$ to obtain low propagation losses). This length is a good compromise because it is not necessarily being sought to make the cavity very small because sensitivity depends on area.

For a master frequency f1 of about $1.94 \times 10^{14}$ Hz ($\lambda$=1.55 µm) N1 is therefore about 51000.

It is sought to offset the slave frequencies f2 and f3 by at least one whole FSR.

It is possible to use: +1·FSR(N2=N1+1), and −1·FSR (N3=N1−1).

It is also possible to use: +1·FSR and +2·FSR(N2=N1+1 and N3=N1+2) etc. or −1·FSR and −2·FSR(N2=N1−1 and N3=N1−2).

On account of the value of the FSR, an offset of a few FSRs must be used if compatibility with photodiodes integratable into integrated-optical circuits, etc. is to be guaranteed.

The gyroscope 50 according to the invention is compatible with integrated-optics technology, because it does not require acousto-optical modulators.

In addition, the use of OPLL loops is compatible with the orders of magnitude of the offsets to be achieved and an integrated-photonic implementation, thereby allowing bulk and total cost to be drastically decreased.

The optical block of the gyroscope 50 is defined as comprising the paths of the optical beams output by the lasers and the optical components (such as the phase modulators) necessary to implement said gyroscope and including the photodetectors.

Figure 11:
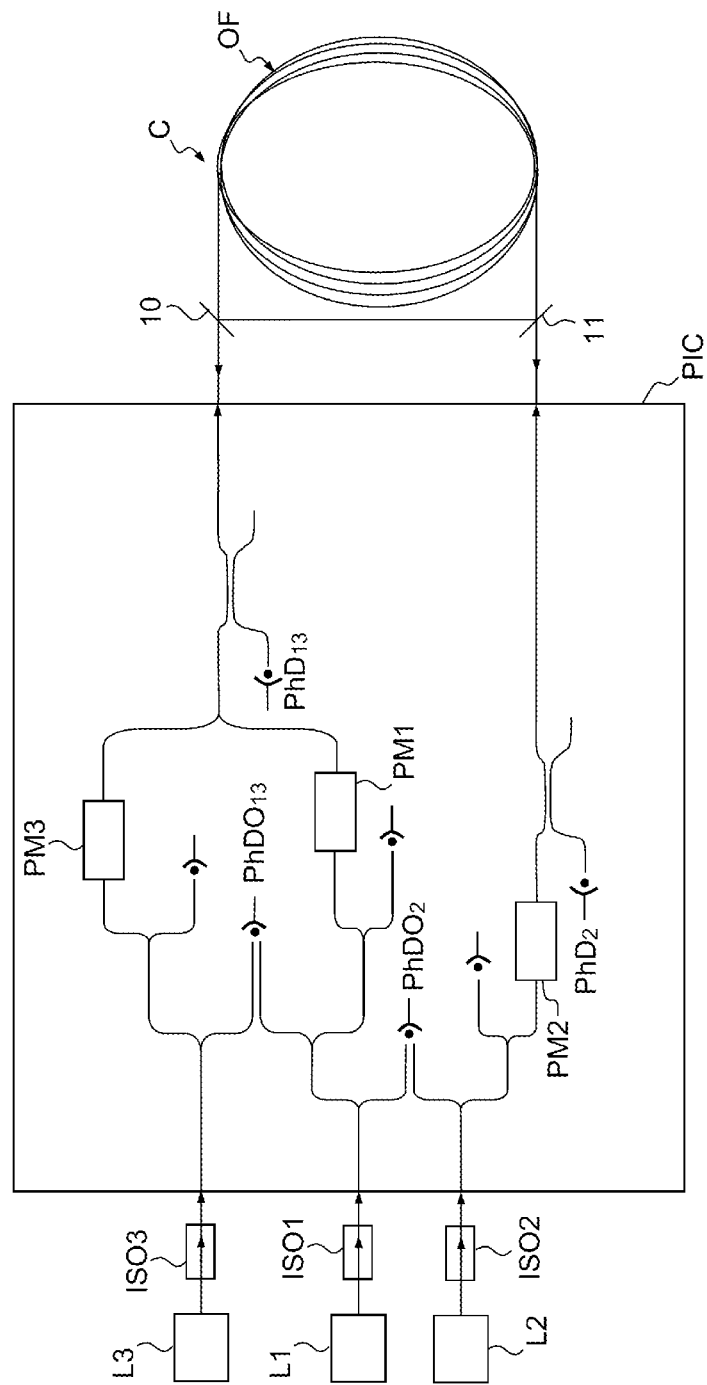
FIG. 11 illustrates a gyroscope according to the invention comprising a photonic circuit produced in integrated-optics technology

At a first level of integration illustrated in FIG. 11, the optical block is a photonic circuit PIC produced in integrated-optics technology, for example on a silicon or InP substrate, or on a substrate of any other material compatible with the required functionalities. Coupling into and out of the circuit PIC may be achieved via its edge face or directly out of the plane of the circuit using gratings. In addition, in FIG. 11, each modulator PM1, PM2, PM3 is equipped with a photodiode. This allows the power of the three beams to be measured and controlled and thus the Kerr effect associated with any difference in the power of two waves propagating in opposite directions through the cavity to be decreased. This circuit PIC may then be connected to a mirror-based cavity (FIG. 11) or indeed a fibre-based cavity. Thus the optical block is produced in the form of at least one integrated circuit.

At a higher level of integration, the cavity and/or the injecting lasers are also produced in integrated-optics technology.

For the sake of clarity, the measurement of the frequencies f1, f2 and f3 allowing the length of the cavity and the speed of rotation to be determined are not shown. This measurement may be carried out in two ways.

According to one variant, a calibration of the control signals injected into the OPLLs and the master laser are used to determine f1, f2 and f3.

According to another variant, the optical beams are used directly. For example, by sampling a portion of F1 and F3 before the coupler 10 (FIGS. 5 and 11) or before the coupler C1 (FIGS. 9 and 10) and by transmitting this optical signal to a photodiode, f1-f3 may be measured directly using a frequency counter. As it is a question of a beat, it is also possible to use RLG laser-gyro methods directly (provided that the passband is suitably adapted). Likewise, by sampling and combining F1, F3 and F2, the electrical beat signal will have components—F3, F1-F2, F2-F3 that may be filtered and measured. According to another variant, a configuration that is a mix of FIGS. 9 and 10 is used: the reflected beams are used for the servocontrol (this also allowing a first set of cavity-length and speed-of-rotation values to be obtained) and the transmitted beams are recombined to deduce from the beating thereof a second set of cavity-length and speed-of-rotation values.

The invention claimed is:

1. A passive resonant optical gyroscope operating with three frequencies, the gyroscope comprising:
   a cavity;
   a first injecting laser configured to inject a first optical beam into the cavity in a first direction;
   a second injecting laser configured to inject a second optical beam into the cavity in a direction opposite the first direction;
   a third injecting laser configured to inject a third optical beam into the cavity in one of the two aforementioned directions, one laser amongst one of the injecting lasers, which is selected as master laser, having a master frequency, the two other injecting lasers, which are respectively denoted the first and second slave lasers, respectively having a first slave frequency and a second slave frequency;
   a master servocontrol device configured to directly servocontrol the master frequency to an eigenfrequency corresponding to a resonant mode of the cavity or to servocontrol an eigenfrequency corresponding to a resonant mode of the cavity to the master frequency of the master laser;
   a first servocontrol stage comprising a first slave device and a second slave device that are configured to respectively generate a first frequency error signal and a second frequency error signal having a minimum absolute value when the first and second slave frequencies each correspond to a resonant mode of the cavity, respectively; and
   a second servocontrol stage comprising a first optical phase-locking device and a second optical phase-locking device respectively comprising a first slave oscillator and a second slave oscillator that are configured to generate a first radiofrequency offset signal and a second radiofrequency offset signal, wherein
   said first and second optical phase-locking devices being configured to respectively make the first slave laser coherent with the master laser and the second slave laser coherent with the master laser and to servocontrol the first and second slave frequencies to resonant modes of the cavity that are different from the resonant mode corresponding to the master frequency,
   each radiofrequency offset signal of the second servocontrol stage being determined from the corresponding frequency error signal of the first servocontrol stage,
   the first and second optical phase-locking devices respectively comprise a first optical phase-locking device photodetector and a second optical phase-locking device photodetector that are configured to respectively generate a first and a second beat signal, respectively from an optical beam output by the master laser and an optical beam output by the first slave laser, and from an optical beam output by the master laser and an optical beam output by the second slave laser,
   each radiofrequency offset signal has a tunable reference frequency and a reference phase, and wherein each optical phase-locking device is configured to control the frequency of the corresponding slave laser so as to servocontrol the beat signal to the radiofrequency offset signal, the reference frequency being made equal to an integer number of free spectral ranges of the cavity using a correction signal obtained from the corresponding frequency error signal, each slave frequency then respectively being offset from the master frequency by a value corresponding to the corresponding reference frequency, and each optical phase-locking device comprises, to achieve the servocontrol of the beat signal to the radiofrequency offset signal:

a phase comparator configured to compare respectively a phase of the beat signal or of the converted signal and the phase of the radiofrequency offset signal, the comparator being configured to generate a phase error signal; and control electronics configured to generate a correction signal and to control the slave frequency of the slave laser on the basis of the phase error signal.

2. The gyroscope according to claim 1, further comprising:

a first photodetector configured to receive one or more optical beams obtained from the one or more optical beams injected in the first direction and at least one portion of which has made at least one pass through the cavity; and a second photodetector configured to receive the one or more optical beams obtained from the one or more optical beams injected in the second direction and at least one portion of which has made at least one pass through the cavity, said photodetectors being configured to generate three electric signals from the three received optical beams, each electric signal being sent to the master servocontrol device or to the corresponding first or second slave device.

3. The gyroscope according to claim 2, wherein the first and second photodetectors are configured to receive optical beams that are at least partially reflected by the cavity.

4. The gyroscope according to claim 2, wherein the first and second photodetectors are configured to receive optical beams transmitted by the cavity.

5. The gyroscope according to claim 1, wherein the master servocontrol device comprises:

a master phase modulator for modulating the optical beam of the master laser;

a master demodulating device connected to the corresponding output of the photodetector comprising: a master phase shifter, a master oscillator operating at a preset master oscillation frequency that is also used by the master phase modulator, and a master mixer for mixing the signals output by the master oscillator and master phase shifter, a master frequency error signal being obtained from the signal output by the master mixer; and master control electronics configured to generate a correction signal from the master frequency error signal, and to directly control the master frequency of the master laser or a length of the cavity, the frequency of the master laser remaining constant.

6. The gyroscope according to claim 5, wherein the master phase modulator consists of an electric signal that directly modulates the supply current of the master laser at the preset master oscillation frequency.

7. The gyroscope according to claim 1, wherein the master servocontrol device is a Pound-Drever-Hall device.

8. The gyroscope according to claim 1, wherein each slave device of the first servocontrol stage comprises:

a phase modulator for modulating the optical beam of the corresponding slave laser;

a demodulating device connected to the output of a photodetector having detected the corresponding optical beam, and comprising a phase shifter, an oscillator operating at a preset oscillation frequency that is also used by the corresponding phase modulator, and a mixer for mixing the signals output by the oscillator and phase shifter, the frequency error signal being obtained from the signal output by the mixer; and control electronics configured to generate a correction signal from the frequency error signal.

9. The gyroscope according to claim 8, wherein the phase modulator comprises an electric signal that directly modulates the supply current of the corresponding slave laser at the preset oscillation frequency.

10. The gyroscope according to claim 1, wherein the integer number is such that the corresponding reference frequency is comprised in a passband of the corresponding third or fourth photodetector.

11. The gyroscope according to claim 1, wherein each optical phase-locking device comprises a mixer configured to convert a frequency of the beat signal into a converted frequency in the radiofrequency domain, the servocontrol being carried out on the basis of the converted frequency.

12. The gyroscope according to claim 1, wherein an optical block comprising the paths of the optical beams and the optical components required to implement said gyroscope is produced in the form of at least one photonic integrated circuit.

* * * * *